(12) United States Patent
Jones et al.

(10) Patent No.: US 10,614,227 B2
(45) Date of Patent: *Apr. 7, 2020

(54) METHOD AND SYSTEM FOR IDENTIFYING FUNCTIONAL ATTRIBUTES THAT CHANGE THE INTENDED OPERATION OF A COMPILED BINARY EXTRACTED FROM A TARGET SYSTEM

(71) Applicant: BOOZ ALLEN HAMILTON INC., McLean, VA (US)

(72) Inventors: Joshua Jones, Aberdeen, MD (US); Benjamin Demick, Washington, DC (US); Malachi Jones, Odenton, MD (US); Matthew Chung, Montgomery Village, MD (US); Michael Schroeder, Ellicott City, MD (US); Thomas Scida, New Hyde Park, NY (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,753

(22) Filed: Oct. 26, 2018

(65) Prior Publication Data

US 2019/0180037 A1    Jun. 13, 2019

Related U.S. Application Data

(63) Continuation of application No. 15/840,740, filed on Dec. 13, 2017, now Pat. No. 10,133,871.

(51) Int. Cl.
*G06F 21/00* (2013.01)
*G06F 21/57* (2013.01)
(Continued)

(52) U.S. Cl.
CPC .............. *G06F 21/577* (2013.01); *G06F 8/41* (2013.01); *G06F 8/52* (2013.01); *G06F 8/53* (2013.01);
(Continued)

(58) Field of Classification Search
CPC . G06F 21/577; G06F 8/41; G06F 8/52; G06F 2221/033
See application file for complete search history.

(56) References Cited

U.S. PATENT DOCUMENTS 9,164,754 B1 * 10/2015 Pohlack ................. G06F 8/658
9,223,972 B1 * 12/2015 Vincent ................ G06F 21/566
(Continued)

OTHER PUBLICATIONS

Smirnov, Alexey and Tzi-cker Chiueh, Automatic Patch Generation for Buffer Overflow Attacks, 2007, IEEE (Year: 2007).*
(Continued)

*Primary Examiner* — David Le
(74) *Attorney, Agent, or Firm* — Buchanan Ingersoll & Rooney PC

(57) ABSTRACT

Vulnerable code allows outside actors to interfere with the normal operation of current systems. To help defend against these outside actors, it is desirable to identify vulnerabilities in existing systems, including systems where the original source code is not available for study. Described herein are methods for identifying functional attributes that change the intended operation of a compiled binary extracted from a target system.

10 Claims, 4 Drawing Sheets

(51) Int. Cl.
*G06F 8/52* (2018.01)
*G06F 8/41* (2018.01)
G06F 9/455 (2018.01)
G06F 8/53 (2018.01)

(52) U.S. Cl.
CPC ........ *G06F 9/455* (2013.01); *G06F 2221/033* (2013.01)

(56) References Cited

U.S. PATENT DOCUMENTS

| | | | |
|---|---|---|---|
| 2002/0059054 A1* | 5/2002 | Bade | G06F 17/5022 703/20 |
| 2005/0027971 A1* | 2/2005 | Williams | G06F 9/30043 712/227 |
| 2006/0074734 A1* | 4/2006 | Shukla | G06F 8/10 717/107 |
| 2010/0275188 A1 | 10/2010 | Dubinsky et al. | |
| 2015/0331979 A1* | 11/2015 | Englehart | G06F 17/5009 703/2 |
| 2015/0332055 A1 | 11/2015 | Siman | |
| 2016/0188305 A1* | 6/2016 | Rong | G06F 8/31 717/154 |
| 2017/0091428 A1 | 3/2017 | Johnson et al. | |
| 2017/0277562 A1* | 9/2017 | Christian | G06F 9/4881 |

OTHER PUBLICATIONS

International Search Report and Written Opinion of the International Searching Authority (Forms PCT/ISA/220, PCT/ISA/210 and PCT/ISA/237) dated May 1, 2019, by the International Bureau of United States Patent and Trademark Office in corresponding International Application No. PCT/US 18/65396. (16 pages).

\* cited by examiner

METHOD AND SYSTEM FOR IDENTIFYING FUNCTIONAL ATTRIBUTES THAT CHANGE THE INTENDED OPERATION OF A COMPILED BINARY EXTRACTED FROM A TARGET SYSTEM

RELATED APPLICATION

The present application is a continuation of U.S. patent application Ser. No. 15/840,740, filed on Dec. 13, 2017, granted as U.S. Pat. No. 10,133,871 on Nov. 20, 2018. The entire contents of the earlier application are hereby incorporated by reference in their entirety.

FIELD

The present disclosure pertains to methods for discovering vulnerabilities, such as vulnerabilities in compiled binaries.

BACKGROUND

The benefits derived from using sophisticated software come with the risk of utilizing vulnerable code in critical systems. Vulnerable code allows outside actors to interfere with the normal operation of current systems. To help defend against these outside actors, it is desirable to identify vulnerabilities in existing systems, including systems where the original source code is not available for study.

Tools have been developed to help programmers identify vulnerabilities in existing systems. One category of these tools performs static analysis to verify the properties of software in safety-critical computer systems. For example, the medical, nuclear, and aviation industries have adopted static code analysis to address the quality of the increasingly sophisticated software employed in these fields. Static analysis does not require the programs actually be executed and can instead analyze the source code or the object code. Dynamic analysis, on the other hand, executes the software in a real or virtual processor.

Open source programmers have provided the low level virtual machine (LLVM) compiler infrastructure project with an ability to generate an intermediate representation (LLVM IR) of the software code. The LLVM IR provides a well-defined low-level programming language, similar to assembly, that is a reduced instruction set computing (RISC) instruction set designed to abstract away the details of the target machine architecture. The LLVM project includes tools that convert the LLVM IR into machine-dependent assembly code for the target platform. LLVM IR is also useful because it can be used with a variety of existing tools.

One example of such a tool is KLEE which is a symbolic virtual machine built on top of the LLVM compiler infrastructure. KLEE includes components that can execute the LLVM bitcode modules with support for symbolic values, and a POSIX/Linux emulation layer that provides additional support for making parts of the operating system symbolic. Another example is the low-level bounded model checker (LLBMC) which is a static software analysis tool for finding bugs in low-level system code. Leveraging these existing tools can reduce the amount of duplicate work and facilitate the discovery of aspects of the code which may deviate from the desired operation of the program.

Applicants have determined that it would be desirable to convert the binaries from a variety of existing systems into an intermediate representation that can then be used for automatic discovery of software vulnerabilities, and to automate portions of the vulnerability discovery process so that the converted binaries from the variety of existing systems can be easily and quickly analyzed.

SUMMARY

A method of identifying functional attributes that change the intended operation of a compiled binary extracted from a target system, the method comprising: generating a first intermediate representation of each function from the compiled binary, the first intermediate representation being an machine independent representation; identifying metadata for each function of the compiled binary using the first intermediate representation of the binary; emitting a function prototype corresponding to the identified metadata for each function of the compiled binary; translating the first intermediate representation of the compiled binary into a second intermediate representation of the compiled binary; and applying at least one analyzer on the second intermediate representation of the compiled binary to identify at least one functional attribute that changes intended operation of the compiled binary.

BRIEF DESCRIPTION OF THE DRAWING FIGURES

DETAILED DESCRIPTION OF THE INVENTION

Figure 1:
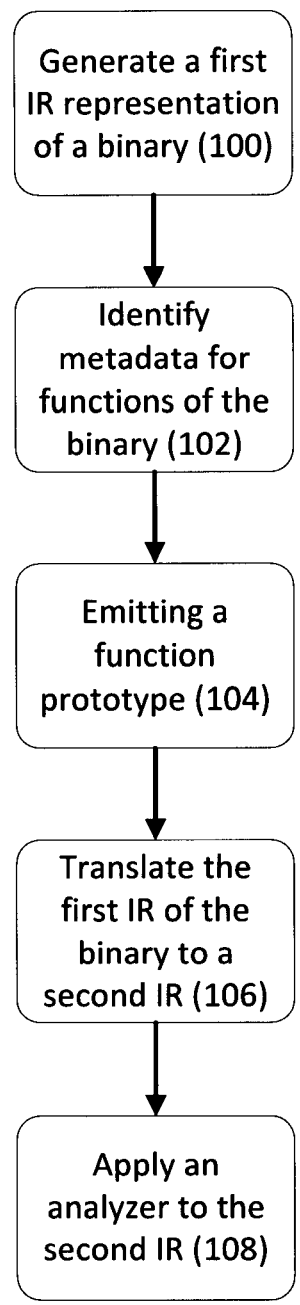
FIG. 1 depicts an embodiment of the method for identifying functional attributes that change the intended operation of a compiled binary extracted from a target system.
Figure 2:
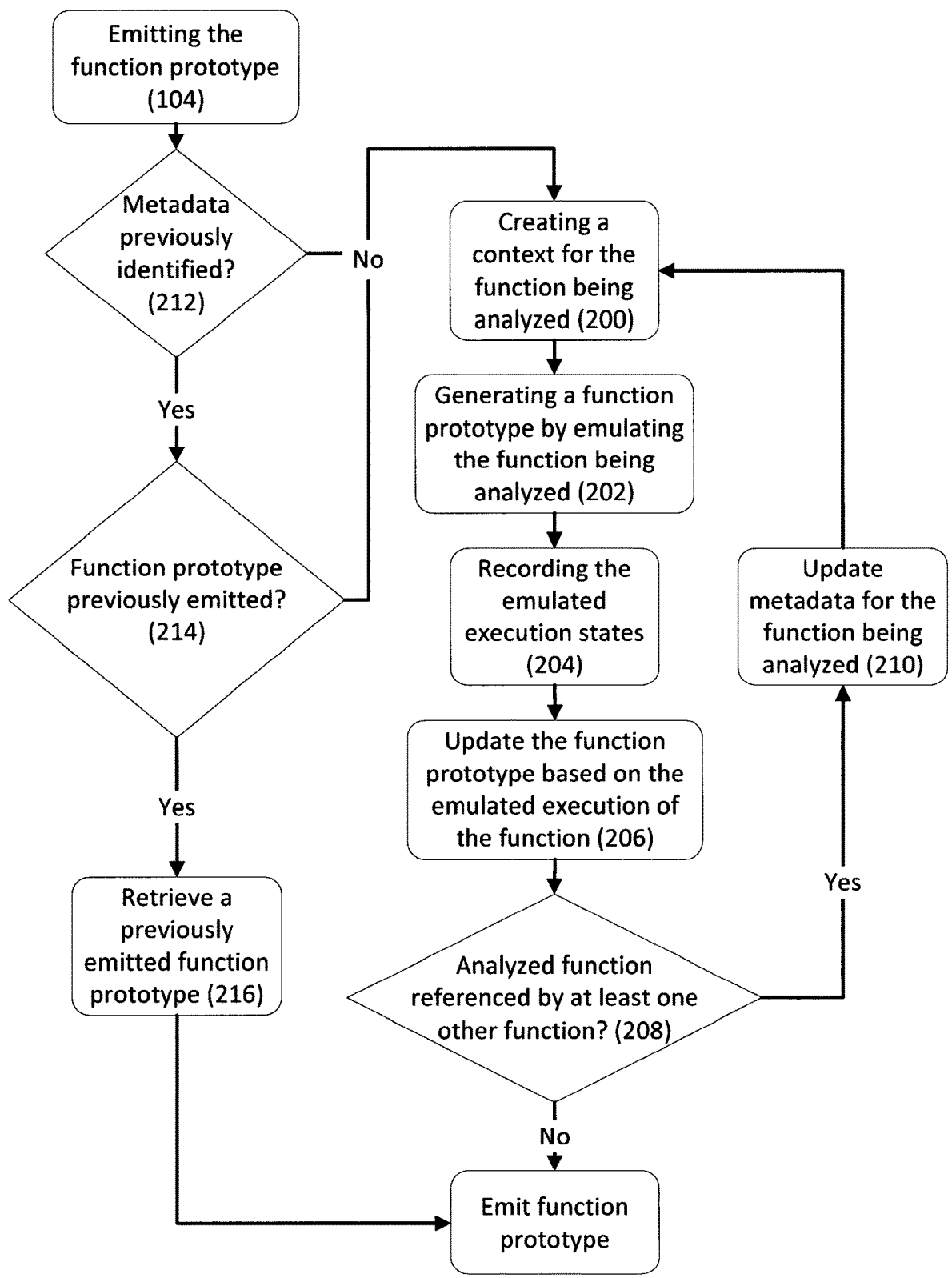
FIG. 2 depicts an embodiment of the emitting of the function prototype performed by an embodiment of the method for identifying functional attributes that change the intended operation of a compiled binary extracted from a target system.
Figure 3:
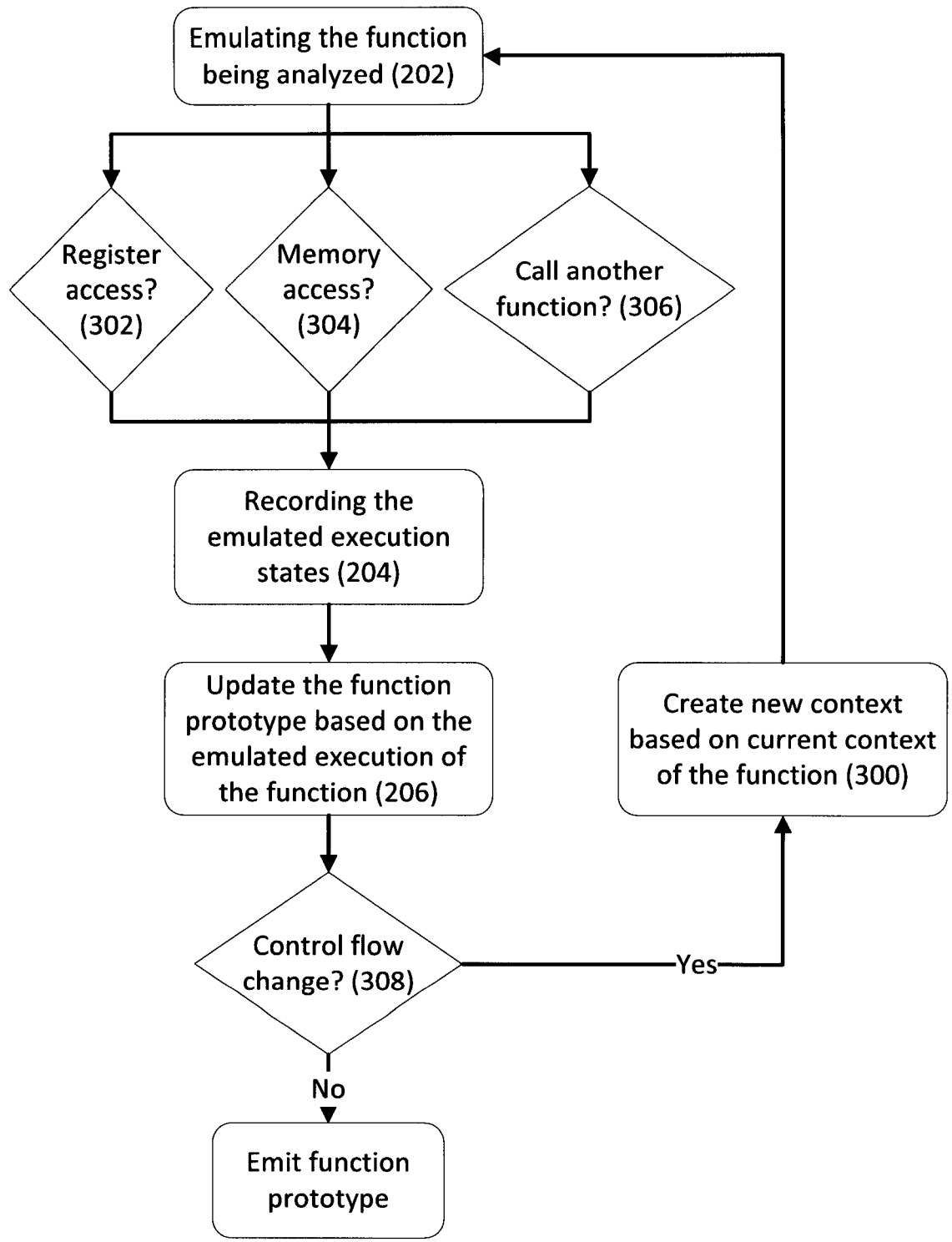
FIG. 3 depicts an embodiment of the emulation of the function being analyzed by an embodiment of the method for identifying functional attributes that change the intended operation of a compiled binary extracted from a target system.
Figure 4:
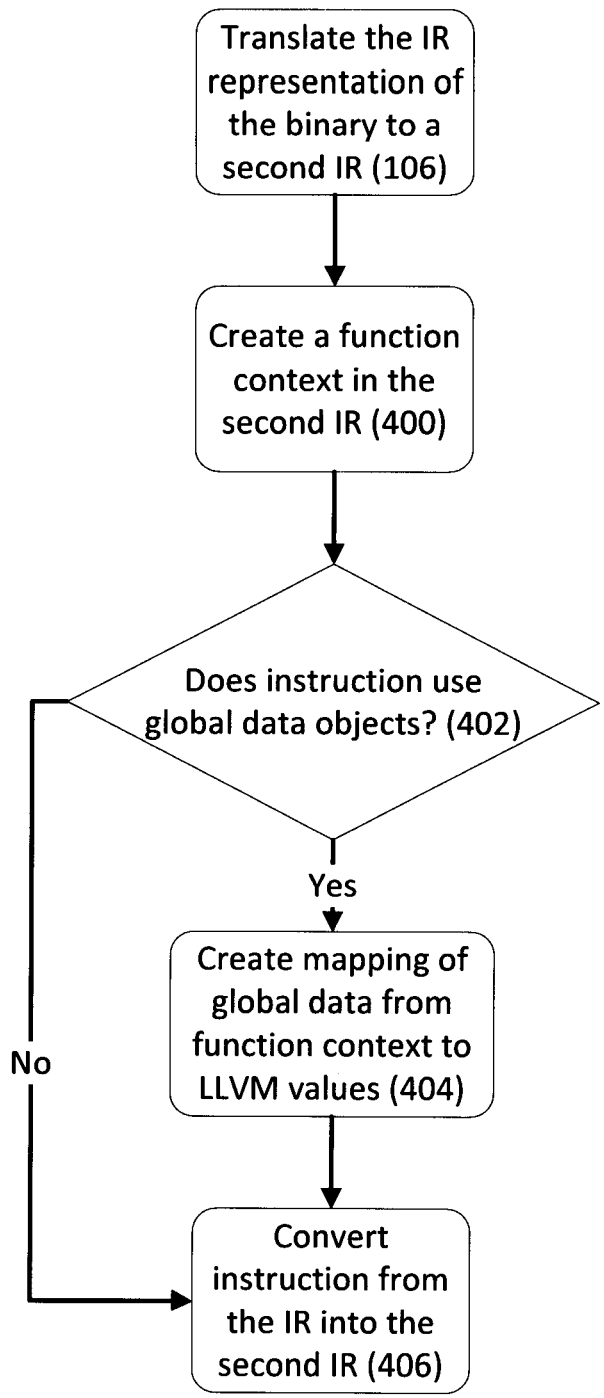
FIG. 4 depicts an embodiment of the translation of the IR representation of the binary to a second IR performed by an embodiment of the method for identifying functional attributes that change the intended operation of a compiled binary extracted from a target system.

FIG. 1 is an example of a method for identifying functional attributes that change the intended operation of a compiled binary extracted from a target system to, for example, allow for automatic discovery of software vulnerabilities. The first intermediate representation (IR) of each function of the compiled binary is generated upon acquisition of the compiled binary from the target system. The compiled binary file includes the machine code corresponding to the instructions from the source code from which the binary file was compiled. The binary file is compiled for use with a specific machine architecture and may be retrieved from the target system using a variety of techniques.

Upon acquisition of the compiled binary file from the target system, a first intermediate representation (IR) of each function of the compiled binary is generated. An IR is a data structure or code that provides a description of the fundamental actions performed by each computer instruction, without loss of information. The first IR is preferably generated in a manner that allows for analysis of machine code for a variety of different machine architectures. In at least one embodiment, the first IR is generated by using binaries compiled for the MIPS, ARM, and PowerPC architectures, as well as the x86 and x86-64 architectures. One tool that may be employed to generate the first IR is included in the Valgrind distribution.

Valgrind has been used for memory debugging, memory leak detection, and profiling. To perform these tasks, Valgrind translates programs into an IR (VEX IR) that is processor-neutral with a static single assignment (SSA) form. One benefit of using VEX IR is that the instructions of the binary file are simplified. For example, because VEX IR has the SSA property, each of the variables in the generated VEX IR is assigned exactly once, and in each variable is defined before it is used. In addition, differences amongst architectures are abstracted away during the generation of the VEX IR, resulting in a simplified first IR that can be more easily translated into a second IR, as described herein.

Another benefit arising from the usage of a simplified IR based on a compiled binary instead of directly using the compiled binary is that certain code obfuscation techniques employed in the compiled binary will likely be removed when the first or the second IR is generated. For example, even if the compiled binary was created from customized assembly language designed to mask the true activities of the binary using opaque predicates, for example, the generation of the first IR from the compiled binary and/or the translation of the first IR into the second IR can remove such obfuscation and reflect the actual activities of the binary. In other circumstances, the IRs themselves may be designed in such a manner that obfuscation techniques such as opaque predicates are removed as a side effect of other optimizations. Such a removal of certain types of obfuscation in the compiled binary is desirable when examining certain types of compiled binaries, and simplifies the analysis of the compiled binaries.

VEX IR provides a consistent, abstracted interface to the registers available on different platforms, and abstracts away differences in memory access models. This simplification of the instructions contained in the binary file helps facilitate the translation of instructions from VEX IR into a second intermediate representation. Additionally, the uplifting of binary code into VEX IR is a well-supported technique. It should be appreciated that VEX IR is being described as one possible tool for generating the first IR, but that other similarly suitable IRs may be utilized in some embodiments.

Once the first IR of the compiled binary is generated (100), the IR is stored for subsequent access. In some embodiments, the IR may be stored in a database. The IR for a particular compiled binary may be organized and stored in IR blocks. In each IR block, a collection of IR statements may be grouped where the IR statements change the state of the target machine. Metadata for the functions of the binary are also identified (102) and stored for subsequent access.

Each function is analyzed and metadata that helps describe the function and the callee functions is updated. This process is completed until each of the functions of the compiled binary, represented by the first IR, have a corresponding function prototype generated.

In some embodiments, functions that are leaf functions are analyzed before other functions. Leaf functions are functions that do not call or reference other functions of the compiled binary. In these embodiments, other functions are analyzed only after all of the leaf functions have been analyzed. As the functions are analyzed, updates to the metadata describing the remaining functions occur as necessary and as described above. Such updated metadata is helpful when generating the function prototypes for the compiled binary. This process is repeated until all the leaf functions and the other functions have been analyzed.

In some instances, the first IR representing the binary may not include all the referenced functions. This may occur when, for example, an external or shared library is to be referenced by a function in the compiled binary when executed on the target system. For example, the compiled binary may reference a shared library to access a database, and IR for the shared library for accessing the database has not been generated. In some embodiments, the function is nevertheless analyzed and a function prototype generated using available information. In certain embodiments, the analysis of these remaining functions where the referenced function is not available is postponed until after the leaf functions are analyzed, and after functions with full context available in the first IR are analyzed. As is apparent, the other functions described above may include both functions with full context in the first IR and functions that reference functions that are not in the first IR generated from the compiled binary.

Function prototypes are emitted (104) through the following process. The IR representing a binary function is retrieved from storage, such as a database. Any metadata associated with the binary function is also retrieved. This metadata may be used to help generate the function prototype for each function of the compiled binary. It is then considered if the metadata was previously identified (212). If yes, and if the function prototype was previously emitted (214), the previously emitted function prototype is retrieved (216). If, however, the metadata was not previously identified, or if the function prototype was not previously emitted, the process for creating the function prototype is executed.

The analysis of each function will now be described. An IR block, or an IR superblock (IRSB) that forms at least part of the function being analyzed is retrieved and initialized. This initialization may include, for example, restoring the memory and register states that result from the parent IRSB. A context created for the function (200) and a function prototype is generated by emulating the function being analyzed (202). The purpose of this emulation is to record all the changes of the state of the target machine when the portion of the compiled binary corresponding to the IR block or IRSB is executed on the target machine. The emulated execution states are recorded in the context (204). The emulated execution states tracked include the parent IRSB, memory, registers, temporary registers, and the number of ancestors.

In particular, during emulated execution (204), IR statements for the IR block or IRSB are retrieved and emulated. IR statements typically change the state of the target machine. For example, IR statements may affect the memory or registers of the target machine, among other aspects. Each of the IR statements are evaluated for access to the registers of the target machine (302), memory access of the target machine (304), calls to other functions on the target machine (306), and other aspects of the target machine.

For example, when evaluating access to the registers (302), the memory and register execution state are read from the function prototype and it is determined if the register being accessed is a parameter passing register based on the application binary interface. If read access of the register is identified, the register execution state is updated for the IR block or IRSB, the read access is analyzed, and it is determined if this was the first access of the register. If this was the first access to the register, the parameter detection is updated for the IR block or IRSB. If this was not the first access of the register, or if no read access of the register is identified, the memory register execution state is updated. Subsequent to these steps, the function prototype is updated for the IR block or IRSB.

As another example, when evaluating memory accesses (304), the memory and register execution state is read from the function prototype, and the read operation is identified in memory. A determination is made as to if the memory access is a read operation. If the memory access is a read operation, it is determined if the read operation occurs on the caller's stack frame. If the read operation occurs on the caller's stack frame, the parameter is detected and identified on the stack. If the read operation does not occur on the caller's stack frame, the execution state is updated. Subsequent to these steps, the function prototype is updated (206).

As a further example, when a call is made to another function (306), the metadata for the callee function is searched for based on the function prototype. It is then determined if the metadata of the callee function has been registered. If the metadata of the callee function has been registered, the callee's parameter info is backwards propagated into the caller, and then the function prototype is updated. If the metadata of the callee function has not been registered, the function prototype is updated (206).

If the control flow of the program changes from one IR block or IRSB to another (308), the current context is copied into a new IR block or IRSB context (300), and this new IR block or IRSB context is placed into the queue for subsequent analysis. Analysis of the current IR block or IRSB then continues until all the IR statements have been emulated (202) and the changes to the target machine recorded in the IR block or IRSB context (204).

This process is repeated for each IR block or IRSB that forms at least part of each function of the compiled binary. If, for example, the function that was analyzed is referenced by at least one other function (208), the metadata for the function being analyzed is updated (210) and the process is repeated. After each of the functions of the compiled binary contained in the IR blocks or IRSBs are initialized and emulated so that function prototypes are generated, any needed post analysis is performed. Finally, the function prototypes are emitted and saved for each of the functions of the compiled binary. In at least some embodiments, the function prototypes may also be stored in a database.

When analyzing the functions contained in the IR blocks or IRSBs, the functions being currently analyzed may be sufficiently similar where the analysis of the function need not be repeated. For example, when evaluating the next IR block or IRSB, the function prototype information and metadata may be sufficiently similar so that a prior analysis of the IR block or IRSB can be utilized instead of separately analyzing the IR block or IRSB. In other situations, even though the function prototype information and metadata are sufficiently similar to satisfy a predefined threshold, the analysis of the function is nevertheless repeated so that an appropriate IR block or IRSB context can be created for the function. In at least some embodiments, analysis of the function is not repeated only when the function prototype information and the metadata are identical. In still further embodiments, analysis of the function is not repeated only when the function prototype information and the metadata are identical, and other aspects such as the parent IR block or IRSB are also sufficiently similar or identical.

Once the first IR has been generated and function prototypes for each function of the compiled binary are emitted, the second IR is translated from the first IR using the following process (108). The second IR is typically an intermediate representation against which additional tools can be utilized to analyze the compiled binary. This is particularly useful in scenarios where the compiled binary is obtained from a field where few tools or debuggers are available to analyze the compiled binary. In other scenarios, the original creators of the compiled binary may not be available and so it is desirable to convert the compiled machine code into a more easily used format.

To create the second IR, it is desirable to select an IR that allows for the usage of existing tooling, where appropriate. As discussed, examples of such tools include KLEE, a symbolic virtual machine built on top of the LLVM compiler infrastructure, and LLBMC, a static software analysis tool for finding bugs in low-level system code. By utilizing these existing and proven tools, analysis of the compiled binaries extracted from target systems is facilitated.

One established IR that may be utilized as the second IR is the IR generated from the LLVM compiler infrastructure project and associated projects. Like VEX IR, LLVM IR also exhibits the SSA property which helps simplify the translation of the first IR into the second IR.

As discussed above, in at least one embodiment, VEX IR is utilized to generate the first IR, and VEX IR also exhibits the SSA property. Accordingly, in at least some embodiments, both the first and second IRs may have the SSA property so that each variable is assigned exactly once, and so that each variable is defined before it is used. By utilizing IRs that exhibit the SSA property, simplification of the IR is possible without losing the functional capabilities of the compiled binary.

Even if, however, the first and second IRs share some similar characteristics, often times the first and second IRs will represent information in different ways. For example, in some embodiments, a mapping of the memory locations from the first IR must be created to translate memory locations from the first IR into locations usable by the second IR. This mapping of the memory locations may be created by enumerating all the data items identified by the disassembler and creating equivalent values for each of the data items. In other embodiments, the mapping of the memory locations may only be performed for certain data items identified by the disassembler.

The following is an example translation of the instructions from the first IR into the second IR. First, an instruction set in the first IR is received. For example, the instructions from the first IR may include loading a value, and then performing a mathematical operation on the value with another operand. If, for example, the second IR represents native registers in the target system as global values, these values are maintained in the module context that is generated as described above. When such a second IR is being used, a load instruction in the second IR is created based on the instruction from the first IR, and the second IR load instruction is given the specific location in the module context that corresponds to the native register being expected by the compiled binary, and in some instances, the first IR.

For the second instruction from the first IR that performs a mathematical operation on the value with another operand, a corresponding second IR instruction is created that maps the specific location in the module context where the value was loaded by the load instruction in the IR. Accordingly, the instruction in the second IR performing the mathematical operation on the value will be able to obtain the value from the module context and execute the task. If the first IR instructs that this value is stored in another variable for subsequent use, an appropriate location in the module context is utilized to store the information.

In a further example, the translation of the instructions from the first IR to the second IR where the instruction includes global data will be described. In the first IR, the instructions load a value from a particular address. Previously created mappings generated when considering the first IR are relied upon to satisfy the loading of the value from the particular address. In some embodiments, the mapping replaces the static lookup from the first IR with a corresponding mapping to global data.

Continuing the example, in the first, IR, the instructions multiply two values. In the second IR, the instruction multiplying the two values is translated into multiple equivalent second IR statements. In some embodiments, when, the second IR instructions exceed the specified storage limits for a certain data type, this possibility is accommodated during translation by modifying the data types in the second IR. For example, if the two values being multiplied are 32-bit values, the result may exceed the available size in 32-bit data types. In such a circumstance, at least the data type of the result is modified to accommodate this possibility. In certain embodiments, the data type of the operands are also modified to conform with the modified data type of the result.

The translation of functions from the first IR to the second IR will now be described where the first IR is VEX IR and the second IR is LLVM IR (106). The process of translation involves the conversion of instructions from VEX IR into LLVM IR. First, a new LLVM function object will be created based on a function prototype (400). It is then considered if the VEX IR instruction uses any global data objects (402). If not, the VEX IR instruction is converted into LLVM IR as described below. If global data objects are used (402), the global data objects are then created from the LLVM function objects and any available disassembly metadata. In particular, a mapping of global data from the function context to LLVM values is created (404). Next, LLVM basic block objects are created from the first IRSB. The LLVM basic block objects are then associated with the LLVM function object. This process continues until the last function in the queue is processed. In at least some embodiments, the queue may be stored in a database.

Once these functions are processed, the intermediate representation for each of the LLVM basic block objects are loaded and each instruction in the VEX IR is converted into a corresponding LLVM instruction (406). For example, if the VEX statement is a "Put" statement, it is converted into a corresponding LLVM instruction, and the LLVM module store is updated. Similarly, if the instruction is a "WrTmp," "Store," "Exit," or "LLSC" statement, each of these are converted into corresponding LLVM instructions and the LLVM module store is updated. In some situations, an error to indicate that instructions in the first IR that were not recognized are unsupported may be provided.

Each expression in the intermediate representation for each of the LLVM basic block objects is also converted to LLVM instructions. When, for example, the VEX IR expression is a "Binop," it is converted to a corresponding LLVM instruction. Similarly, when the VEX IR expression is a "Triop," "Const," "Get," "Load," "Rdtmp," "Unop," or "ITE," each of these expressions are converted into corresponding LLVM instructions. In some situations, an error to indicate that instructions in the first IR that were not recognized are unsupported may be provided.

Each VEX IR BinOp expression in the intermediate representation for each of the LLVM basic block objects is also converted to LLVM instructions. When, for example, the BinOp expression is "Iop_Add," an LLVM instruction is created for the named operation. Similarly, when the VEX IR BinOp expression is "Iop_Sub," "Iop_Mull," "Iop_Div," "Iop_Clz," "Iop_CMP," "Iop_And," "Iop.or," "Iop.Xor," "Iop_Not," "Iop_SW.shr,sar," each of these BinOp expressions are converted into corresponding LLVM instructions. In some situations, when the BinOp expression is "Iop_CMP," it is considered whether the operation is a float or signed expression. Appropriate LLVM instructions are created for the float or signed expressions, as appropriate.

The process is repeated until each of the functions from the VEX IR are translated into LLVM IR. Once the VEX IR is translated into LLVM IR (106), an analyzer can be applied to the LLVM IR (108). The analyzer may identify at least one functional attribute in the LLVM IR that changes the intended operation of the compiled binary. In one embodiment, buffer overflows are identified by the analyzer. Buffer overflows can change the intended operation of the compiled binary and can be used, alone or in combination with other aspects that change the intended behavior of the compiled binary, to cause the target system to behave in an unexpected manner.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of securing a target system by automatically detecting vulnerabilities in the target system by identifying at least one functional attribute that changes an intended operation of a compiled binary extracted from the target system, the method comprising:
   receiving a translated intermediate representation input (TIRI) of each function from the compiled binary, wherein the TIRI is based on a machine independent intermediate representation (MIIR) that is generated from a function prototype corresponding to metadata identified for each function of the compiled binary; and
   applying at least one analyzer on the TIRI to identify the at least one functional attribute.

2. The method of claim 1, wherein the function prototype is derived from a context for a function of the compiled binary, the context being based on the MIIR of the function, the method comprising:
   generating the function prototype by emulating execution of the function;
   recording the emulated execution states in the context for the function of the compiled binary;
   updating the function prototype based on the emulated execution and the context;
   when the function is referenced by at least one other function of the compiled binary, updating metadata of the function; and
   emitting a function prototype of the at least one other function.

3. The method of claim 1, comprising:
   retrieving the function prototype when metadata for a second function in the compiled binary has been previously identified and a function prototype corresponding to the second function exists.

4. The method of claim 1, wherein the function prototype provides a function signature.

5. The method of claim 2, wherein the generating of the function prototype changes the context of the function, the changes being recorded in the function prototype and the context for each function.

6. The method of claim 2, wherein the function prototype for a plurality of functions of the compiled binary are grouped into a functional block.

7. The method of claim 2, comprising:
creating a new context for the function with a changed control flow when the function changes control flow, the new context being derived from the current context and the changed control flow.

8. The method of claim 2, wherein the emulated execution states include register accesses, memory accesses, and calls to other functions.

9. The method of claim 1, wherein the TIRI is produced by a method, which comprises:
creating a function context for each function in the TIRI based on the function prototype in the MIIR;
when the MIIR of each function uses global data objects, mapping the global data objects from the function context to data in the TIRI; and
converting instructions from the MIIR into corresponding instructions in the TIRI.

10. The method of claim 9, wherein the converting of the instructions is at least partially based on the metadata.

* * * * *